(12) United States Patent
BUschnakowski et al.

(10) Patent No.: US 8,869,613 B2
(45) Date of Patent: Oct. 28, 2014

(54) SENSOR END MODULE, SENSOR AND MEASURING SYSTEM

(71) Applicant: Endress + Hauser Conducta Gesellschaft für Mess- und Regeltechnik mbH + Co. KG, Gerlingen (DE)

(72) Inventors: Stephan BUschnakowski, Chemnitz (DE); Ronny Michael, Erlaub (DE); Ronny Grosse-Uhlmann, Leipzig (DE)

(73) Assignee: Endress + Hauser Conducta Gesellschaft für Mess- und Regeltechnik mbH + Co. KG, Gerlingen (DE)

( * ) Notice: Subject to any disclaimer, the term of this patent is extended or adjusted under 35 U.S.C. 154(b) by 16 days.

(21) Appl. No.: 13/709,087

(22) Filed: Dec. 10, 2012

(65) Prior Publication Data
US 2013/0160542 A1    Jun. 27, 2013

(30) Foreign Application Priority Data
Dec. 8, 2011    (DE) .......................... 10 2011 088 012

(51) Int. Cl.
| G01D 11/24 | (2006.01) |
| G01L 19/14 | (2006.01) |
| G01P 1/02 | (2006.01) |
| G01N 7/00 | (2006.01) |
| G01N 9/00 | (2006.01) |
| G01D 21/00 | (2006.01) |

(52) U.S. Cl.
CPC .............. *G01D 11/245* (2013.01); *G01D 21/00* (2013.01)
USPC .......... 73/431; 73/23.31; 73/23.32; 73/23.33; 73/31.05

(58) Field of Classification Search
USPC ............................ 73/431, 23.31–23.33, 31.05
See application file for complete search history.

(56) References Cited

U.S. PATENT DOCUMENTS

| 7,138,926 | B2 * | 11/2006 | Henry et al. ............... 340/693.5 |
| 2007/0215531 | A1 | 9/2007 | Wawrla | |
| 2007/0229229 | A1 * | 10/2007 | Nelson et al. ............. 340/10.41 |
| 2011/0247424 | A1 * | 10/2011 | Mayr et al. ....................... 73/722 |
| 2013/0271124 | A1 * | 10/2013 | Kirkpatrick et al. .......... 324/251 |

FOREIGN PATENT DOCUMENTS

| DE | 202008004908 | | 9/2008 |
| DE | 202008004908 U1 * | 9/2008 |
| DE | 102009047299 A1 | | 7/2011 |
| DE | 102009047299 A1 * | 7/2011 |
| EP | 1834927 A1 | | 9/2007 |
| GB | 88 07307.6 | | 3/1989 |

OTHER PUBLICATIONS

German Search Report, Sep. 20, 2012, Munich.

\* cited by examiner

*Primary Examiner* — Lisa Caputo
*Assistant Examiner* — Jamel Williams
(74) *Attorney, Agent, or Firm* — Bacon & Thomas, LLP

(57) ABSTRACT

The invention relates to A sensor end module, comprising: a sensor cap having a first connecting element and a sensorially active element for contact with a medium; and a memory module, comprising: a housing having a second connecting element, wherein the second connecting element enters into a shape- and/or force interlocking connection with the first connecting element; a memory element, wherein the memory element contains information concerning the sensorially active element the memory element is arranged in or on the housing; a first communication interface for sending and/or receiving information and/or data, and wherein the first communication interface is in electrical contact with the memory element. Furthermore, the invention relates to a sensor and a measuring system.

9 Claims, 2 Drawing Sheets

SENSOR END MODULE, SENSOR AND MEASURING SYSTEM

TECHNICAL FIELD

The invention relates to a sensor end module, a sensor comprising the sensor end module, and a measuring system comprising the sensor end module.

BACKGROUND DISCUSSION

In analytical technology, sensors are known to possess individual components, which must, in the course of time, be replaced. Thus, such components can age and no longer have the desired properties. Also, certain ingredients can be depleted and must be replaced for further operation.

Examples of this are electrochemical sensors, for example, amperometric, or optical sensors. Frequently in such cases, a crucial element of the sensor, for example, a membrane, plays a deciding role. The membrane changes its chemical, physical and/or biological features in the presence of a certain substance usually corresponding to the process variable to be determined. An example of this is a membrane, which reacts sensitively to oxygen. There are, however, also other ion-selective membranes known for the most varied of substances.

The changes in the features of the membrane can be read-out, for example, optically or (electro-) chemically. For an exact determining of the process variable, it is decisive to know the characteristic properties, e.g. calibration data, of the membrane and to be able to let these enter into the determining of the process variable by a measurement transmitter or the like.

Since each batch, in the extreme case even each individual membrane, possesses different, deviating properties, the features of the membrane are usually measured at the factory and either directly written, or else input manually, into the measurement transmitter. At the latest, in the case of membrane replacement, the properties must be input manually. This is tiresome and error susceptible.

Known from U.S. Pat. No. 7,138,926 B2 is a sensor end module having a memory and at least one additional electrical component. The memory can contain features of the membrane. Since the membrane, as already mentioned, must be replaced frequently, the co-integration of an additional electrical component is expensive.

Known from DE 20 2006 007 582 U1 is a sensor end module with a fixedly connected memory. In such case, the memory must be installed already in the production of the sensor. Since, in the manufacture of the individual sensor components, partially high manufacturing temperatures occur, for example, due to glass melting, welding, etc., the memory must resist these temperatures.

SUMMARY OF THE INVENTION

An object of the invention, therefore, is to provide a sensor end module, a sensor and a measuring system, which can be manufactured simply and for which characteristic features can be unequivocally identified and associated.

The object is achieved by a sensor end module, comprising:
a sensor cap having a first connecting element and a sensorially active element for contact with a medium; and
a memory module, comprising:
a housing having a second connecting element,
wherein the second connecting element enters into a shape- and/or force interlocking connection with the first connecting element;
a memory element,
wherein the memory element contains information concerning the sensorially active element,
wherein the memory element is arranged in or on the housing; and
a first communication interface for sending and/or receiving information and/or data, and
wherein the first communication interface is in electrical contact with the memory element.

This is advantageous. The memory module enters into a shape- and/or force interlocking connection with the sensor cap and the connection can be released when desired. An option is to provide a special tool for applying and removing the memory module. Also, the memory module can be applied after (high temperature) manufacturing steps have been completed. A communication interface assures communication of the information and/or data stored in the memory module.

In a preferred embodiment, the sensorially active element is a membrane, wherein the membrane is so embodied that it changes its chemical, physical and/or biological features as a function of a substance of the medium. Thus, for instance, the concentration of a substance can be measured. An option, for instance, is that electrochemical or optical features of the membrane are involved.

In an advantageous embodiment, the substance is gaseous or dissolved oxygen.

Advantageously, the information includes an identification number, calibration data, date of manufacture, production data, identifying data of the sensorially active element and/or operating data.

In a desirable form of embodiment, the housing is manufactured of a non-conductive material. If the housing were manufactured of a conducting material, in given cases, communication could become difficult or even impossible. An option is that the housing material comprises a synthetic material, e.g. a plastic, while another option is that the housing material comprises ceramic.

In an advantageous embodiment, a mechanical encoding is provided on the first connecting element and on the second connecting element, wherein the mechanical encoding unequivocally associates the first connecting element with the second connecting element.

Options here include various groove and spring combinations for unique associating of memory module with sensor cap. Thus it can be assured that, for a certain sensor cap, only the corresponding memory module is applied. Furthermore, an option is that the memory module is placed into the sensor cap. A corresponding groove and spring combination permits only a unique arrangement of the memory module in the sensor cap.

In an advantageous embodiment, an electronic fuse is provided, which is so embodied that only a one-time read-out of the information of the memory element is possible.

Anther option is here the setting of a bit as readout confirmation. It can so be assured that an already replaced, possibly defective, memory module, and, therewith, also sensor end module, is not reused.

Preferably, the first communication interface is a contact equipped or contactless interface. An option is that it is a sliding contact, one or more contact pins or a near field, interface component, especially an RFID interface component.

The object is furthermore achieved by a sensor comprising the sensor end module and a sensor shaft having
- a second communication interface compatible with the first communication interface for sending and/or receiving information and/or data to/from the first communication interface,
- a measuring component for registering chemical, physical and/or biological features of the sensorially active element, and
- a superordinated unit for processing the features of the sensorially active element registered by the measuring component and/or the information in the memory element, wherein mechanical connecting means are provided, which connect the sensor end module with the sensor shaft.

The measuring component registers the features of the sensorially active element. These features have changed due to the substance to be measured. These changes are registered and processed and taken into consideration by the superordinated unit. The information concerning the sensorially active element and located in the memory module is sent via the first/second communication interface to the superordinated unit and taken into consideration for calculating the process variable.

In an advantageous further development, the measuring component is an optical transmission system and an optical receiving system. This is used to register the features of the sensorially active element. For example, the transmission system sends light (i.e. electromagnetic radiation) with a certain wavelength and receives the light reflected on the sensorially active element. The light is changed at the sensitive element, for example, in intensity, wavelength, phase, decay time, among other things, as a function of the concentration of the substance to be measured, so that the concentration of the substance to be measured can be deduced from such change.

An option is that the memory module is pushed onto the sensor shaft and the sensor cap enters into a shape- and/or force interlocking connection with the memory module when the sensor end module is connected with the sensor shaft via the mechanical connecting means.

The object is furthermore achieved by a measuring system comprising the sensor end module and further comprising:
- a reading unit having a second communication interface compatible with the first communication interface for sending and/or receiving information and/or data to or from the first communication interface,
- a connecting element, and
- a superordinated system;
- wherein the connecting element electrically connects the reading unit with the superordinated system, and
- wherein the superordinated system reads the information and/or data out of the memory element and/or writes into the memory element.

The reading unit and the first/second communication interface permit the information and/or data in the memory module to be transmitted bidirectionally via the connecting element (for example, a cable or a wireless interface) into and out of a superordinated system. This is advantageous. The data can then be loaded directly into the superordinated system. If, for example, a sensor is connected to the superordinated system, the information can be written by the superordinated system into the sensor. The sensor then needs no reading system. Since the reading unit is operated away from the process, it does not to be designed for the most varied of (process-) temperature ranges, but, instead, can be designed for normal environmental temperatures.

BRIEF DESCRIPTION OF THE DRAWINGS

The invention will now be explained based on the drawing, the figures of which show as follows.

Figure 1:
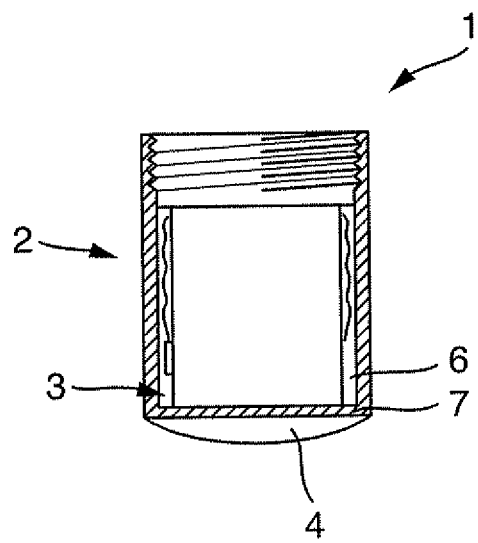
FIG. 1 is a sensor end module of the invention.

In the figures, equal features are provided with equal reference characters.

DETAILED DISCUSSION IN CONJUNCTION WITH THE DRAWINGS

Reference character 1 refers to the sensor end module in its totality, as shown in FIG. 1.

Sensor end module 1 is embodied in two parts, namely sensor cap 2 and memory module 3. The sensor cap 2 has on its lower end a sensorially active element 4, which is embodied in this example in the form of a membrane. Sensor cap 2 is manufactured, for example, of stainless steel. The sensorially active element 4 is in contact with a medium 5. Located in the medium 5 is the substance to be measured.

Without limitation to generality, the invention will be explained in greater detail below based on an oxygen sensor, i.e. the substance to be measured is gaseous, or dissolved, oxygen. In this case, the sensorially active element 4, i.e. the membrane, changes its chemical, biological, or, especially here, its physical, especially its optical, features as a function of oxygen concentration.

Sensor cap 2 is connected with memory module 3 via a first connecting element 6 and a second connecting element 7. Used for this can be, here, the known groove and spring principle, wherein the groove and/or the spring can be so embodied that a special tool is necessary for the engaging and/or disengaging. Memory module 3 can snap into the sensor cap 2. Another option, however, is that memory module 3 is simply inserted into sensor cap 2. A further option is that a mechanical encoding is provided, which enables that only a certain memory module 3 is connectable with a certain sensor cap 2. The groove and spring principle can also be used to achieve that memory module 3 is connectable with sensor cap 2 only in a defined position. Thus, it can be assured, for instance, that a first and second communication interface 10, 11 (see below) are positioned ideally with respect to one another.

Figure 2A:
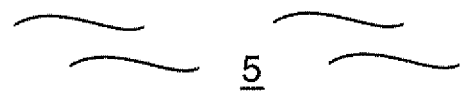
FIG. 2a is a section of the sensor end module of the invention, which shows the memory module.
Figure 2A:
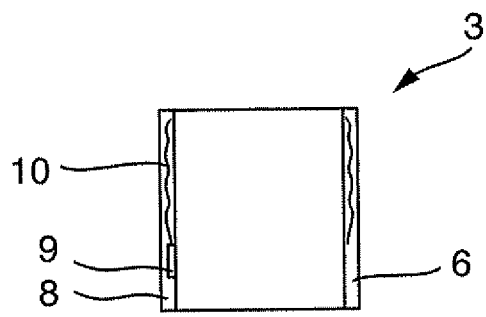
Figure 2B:
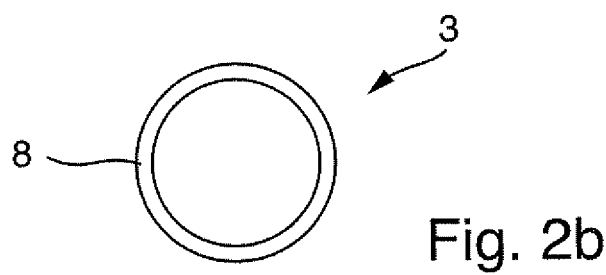
FIG. 2b is the section of FIG. 2a in plan view.

FIGS. 2a and 2b show the memory module 3, wherein FIG. 2b shows memory module 3 in plan view.

Memory module 3 is composed of a housing 8, which is manufactured, for example, of a synthetic material, e.g. plastic, or a ceramic. Preferably, a non conductive material is selected. Housing 8 can be an injection molded part or a part manufactured using a lathe. In the example, housing 8 is ring-shaped, so that it can be inserted into sensor cap 2, in given cases, secured by the connecting elements 6, 7.

Placed in housing 8, for example, adhered or potted, is a memory element 9. Memory element 9 is, for example, an EEPROM, or a flash-memory. Located in memory element 9 is information concerning the sensorially active element 4, for instance, an identification number, calibration data, date of manufacture, production data, identifying data of the sensorially active element and/or operating data.

Also located in housing 8 is a first communication interface 10. Communication interface 10 is electrically connected with memory element 9. The interface can be embodied wirelessly, especially as an RFID interface. Other options, here, include sliding contacts or one or more contact pins.

Figure 3:
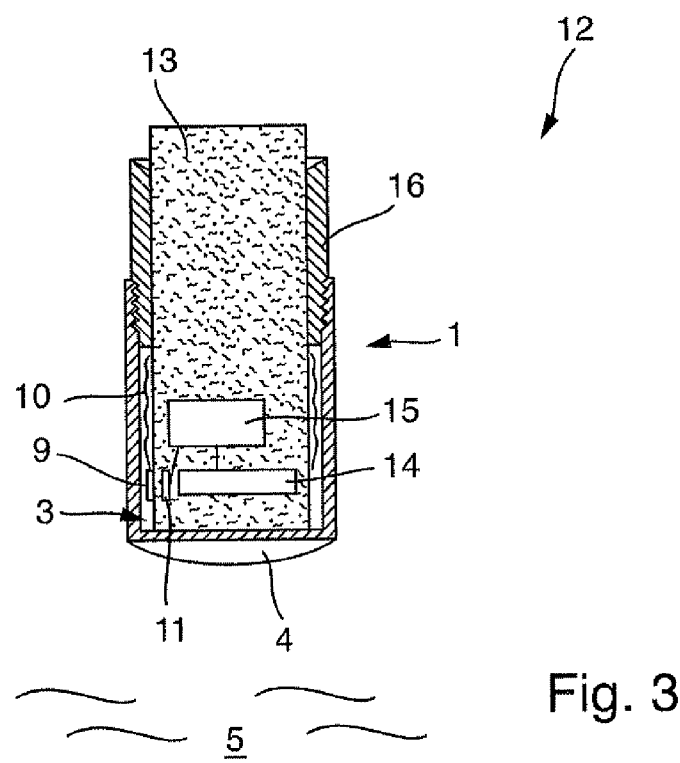
FIG. 3 is the sensor of the invention.

FIG. 3 shows the sensor 12 of the invention. On or in sensor 12, or on or in the sensor shaft 13, is located a second communication interface 11 for communication with memory element 9 via the first communication interface 10. Of course, first and second communication interfaces 10, 11 are compatible with one another, i.e. they can communicate with one another.

Sensor end module 1 is connected via mechanical connecting means 16 with the sensor shaft 13. The mechanical connecting means 16 can be, for instance, screw threads, a bayonet connection, or the like.

Since memory module 3 is ring-shaped in the example, an option is also that memory module 3 can be pushed onto the sensor shaft 13. Then, sensor cap 2 is connected with the sensor shaft 13 via the mechanical connecting means 16. In this way, memory module 3 can then also enter into a shape- and/or force interlocking connection with sensor cap 2.

Located on the media-side end of the sensor shaft 13 is a measuring component 14. Measuring component 14 is, for instance, a transmitting/receiving unit. Thus, the measuring component can include an LED for emitting light for the transmission function as well as a photodetector (for instance, a photodiode or -transistor) for receiving light. The emitted light is changed at the sensorially active element 4 as a function of the oxygen concentration in the medium 5, for example, changed as regards intensity, wavelength, phase, decay time or the like, reflected and received back by the measuring component 14. The difference between emitted and received light as regards intensity, wavelength, phase, decay time, etc. is an indicator for the oxygen concentration in the medium.

A superordinated unit 15, which is also located in the sensor shaft 13, controls, with open or closed loop control, the measuring component 14. Moreover, the superordinated unit 15 reads the information out of the memory element 9. The oxygen concentration is ascertained based on this information and based on the measurement data of the measuring component 14.

Figure 4:
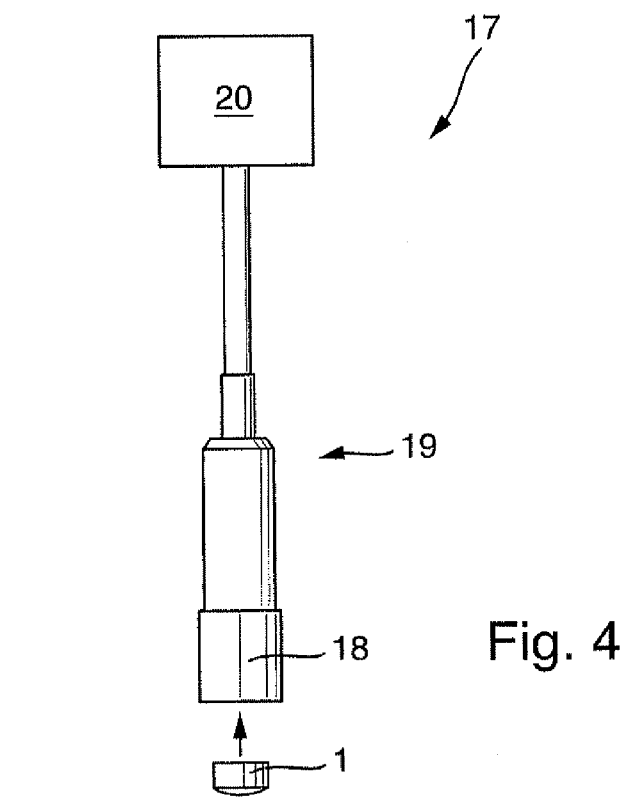
FIG. 4 is the measuring system of the invention.

FIG. 4 shows a measuring system 17 of the invention. In such case, the sensor module 1 is connected with a reading unit 18. The reading unit 18 has a first communication interface 10 compatible with the second communication interface 11. Options include both wireless as well as also wired communication.

If a wireless variant is used, direct contact between sensor end module 1 and reading unit 18 can be omitted—the sensor end module 1 is simply kept in the vicinity of the reading unit 8.

An option is to use an RFID interface. In recent times, galvanically decoupled, for example, optical, capacitive, especially, however, inductive, interfaces have become established. Another option is that the coil of such a galvanically decoupled, inductive interface functions also as coil of an RFID interface.

If a wired variant is used, then contact between sensor end module 1 and reading unit 18 must be produced. Sliding contacts can be used for this, for instance.

Via a connecting element 19, for example, a cable or a wireless connection, the reading unit 18 is connected with a superordinated system 20. The superordinated system 20 is, for instance, a measurement transmitter. The superordinated system 20 can then read the information and/or data out of memory element 9 or selectively also write into memory element 9.

An option is that, instead of a connecting element 19 with reading unit 18, a sensor 12 is connected to the superordinated system 20. If the sensor 12 is equipped without second communication interface 11, the information of the memory element 9, which now is located in the superordinated system 20, can be sent to the sensor 12, especially to the superordinated unit 15.

If only an identification number is in memory element 9, then the superordinated system 20 can obtain the current information and/or data, for example, via the Internet. The manufacturer can make these available online.

In the following, the history of a sensor end module 1 will now be explained in greater detail.

In the plant, both sensor 12, for example, an oxygen sensor, as well as also sensor end module 1 with sensor cap 2 and memory module 3 are manufactured isolated from one another.

Memory module 3 is inserted into sensor cap 2 and, in given cases, affixed with connecting elements 6, 7.

As already mentioned, it is necessary, for exact measurements, to know the features of the sensorially active element 4. Therefore, the sensor cap 2 is measured already in the plant as regards its features and the measured information written, in the form, for example, of calibration data, into memory element 9.

The information important for the exact determining of oxygen concentration can then be moved, in two different ways, into the superordinated unit 15, where the determining/calculating of the concentration occurs.

First, the sensor end module 1 can be connected to a sensor 12, following which the information is written directly via the second communication interface 11 into the sensor 12, respectively into the superordinated unit 15.

Second, the sensor module 1 can be connected to a reading unit 18. As already mentioned, then the information is written via the connecting element 19 and superordinated system 20 into the sensor, respectively into the superordinated unit 15.

An option is that, after one time read-out of the information, a bit is set in memory element 9, in order to prevent that the information is read-out a second time. In this way, it can be prevented that an already used sensor end module 1 is mistakenly used a second time.

The invention claimed is:

1. A sensor end module, comprising:
  a sensor cap having a first connecting element and a sensorially active element for contact with a medium;
  a memory module, comprising: a housing having a second connecting element, wherein said second connecting element enters into a shape- and/or force interlocking connection with said first connecting element; a memory element, wherein said memory element contains information concerning said sensorially active element, wherein said memory element is arranged in or on said housing; a first communication interface for sending and/or receiving information and/or data, and wherein said first communication interface is in electrical contact with said memory element; and
  an electronic fuse which is so embodied that only a one-tme read-out of the information of said memory element is possible.

2. The sensor end module as claimed in claim 1, wherein: said sensorially active element is a membrane, said membrane is so embodied that it changes its chemical, physical and/or biological features as a function of a substance of the medium.

3. The sensor end module as claimed in claim 2, wherein: the substance is gaseous or dissolved oxygen.

4. The sensor end module as claimed in claim 1, wherein: the information includes an identification number, calibration data, date of manufacture, production data, identifying data of said sensorially active element and/or operating data.

5. The sensor end module as claimed in claim 1, wherein: said housing is manufactured of a non-conductive material.

6. The sensor end module as claimed in claim 1, wherein: a mechanical encoding is provided on said first connecting element and on said second connecting element, said mechanical encoding unequivocally associates said first connecting element and said second connecting element.

7. The sensor end module as claimed in claim 1, wherein: said first communication interface is a contact equipped or contactless interface.

8. A sensor for measuring and/or monitoring a process variable of a medium, comprising:
a sensor end module including a sensor cap having a first connecting element and a sensorially active element for contact with a medium; and a memory module, comprising: a housing having a second connecting element, wherein said second connecting element enters into a shape- and/or force interlocking connection with said first connecting element; a memory element, wherein said memory element contains information concerning said sensorially active element, wherein said memory element is arranged in or on said housing; a first communication interface for sending and/or receiving information and/or data, and wherein said first communication interface is in electrical contact with said memory element;
a sensor shaft having: a second communication interface compatible with said first communication interface for sending and/or receiving information and/or data to/from said first communication interface;
a measuring component for registering chemical, physical and/or biological features of the sensorially active element; and
a superordinated unit for processing the features of said sensorially active element registered by said measuring component and/or the information in said memory element, wherein mechanical connecting means are provided, which connect said sensor end module with said sensor shaft, wherein:
said measuring component is an optical transmission system and an optical receiving system.

9. A measuring system comprising a sensor end module, comprising:
a sensor cap having a first connecting element and a sensorially active element for contact with a medium; and a memory module;
a housing having a second connecting element, wherein said second connecting element enters into a shape- and/or force interlocking connection with said first connecting element;
a memory element, wherein said memory element contains information concerning said sensorially active element, wherein said memory element is arranged in or on said housing; a first communication interface for sending and/or receiving information and/or data, and wherein said first communication interface is in electrical contact with said memory element;
a reading unit having a second communication interface compatible with said first communication interface for sending and/or receiving information and/or data to or from said first communication interface;
an electronic fuse which is so embodied that only a one-time read-out of the information of said memory element is possible;
a connecting element; and
a superordinated system, wherein:
said connecting element electrically connects said reading unit with said superordinated system; and
said superordinated system reads the information and/or data out of said memory element and/or writes into said memory element.

* * * * *